United States Patent [19]
Yeakley et al.

[11] Patent Number: 5,973,876
[45] Date of Patent: Oct. 26, 1999

[54] DATA CARTRIDGE SHUTTLE MECHANISM AND METHOD OF OPERATING THE SAME

[75] Inventors: Lester Marvin Yeakley, Estes Park; Clark Milo Janssen, Loveland; Joseph Paul Manes, Arvada; Daniel J. Plutt, Superior; John S. Todor, Arvada, all of Colo.

[73] Assignee: Storage Technology Corportion, Louisville, Colo.

[21] Appl. No.: 08/647,711

[22] Filed: May 14, 1996

[51] Int. Cl.[6] ............................ G11B 15/68; G11B 15/675
[52] U.S. Cl. .......................... 360/92; 242/337; 242/338.4
[58] Field of Search ................................ 360/92, 98.04, 360/98.05, 98.06; 369/34, 36; 242/337, 337.1, 338.4

[56] References Cited

U.S. PATENT DOCUMENTS

| | | | |
|---|---|---|---|
| 4,160,281 | 7/1979 | Sato | 360/92 |
| 5,128,816 | 7/1992 | Imazaike | 360/92 |
| 5,452,149 | 9/1995 | Kim | 360/92 |
| 5,455,725 | 10/1995 | Lee | 360/92 |

*Primary Examiner*—Craig A. Renner
*Attorney, Agent, or Firm*—Duft, Graziano & Forest, P.C.

[57] ABSTRACT

A data cartridge shuttle apparatus (100) is used to permit a robotic hand (40) to insert and remove a data cartridge (246) into and out of a manual cartridge drive mechanism (20). A pawl and lever linkage (104) is rotated to open and close a handle (26) of the tape drive mechanism by contact with a pawl stop (134), which is mounted on a spring-biased sliding block/plate assembly (106). The sliding block/plate assembly has a triangular clasp (228) that engages the data cartridge for extraction of the tape cartridge from the drive bay to a point where the robotic hand can grasp and remove it.

14 Claims, 11 Drawing Sheets

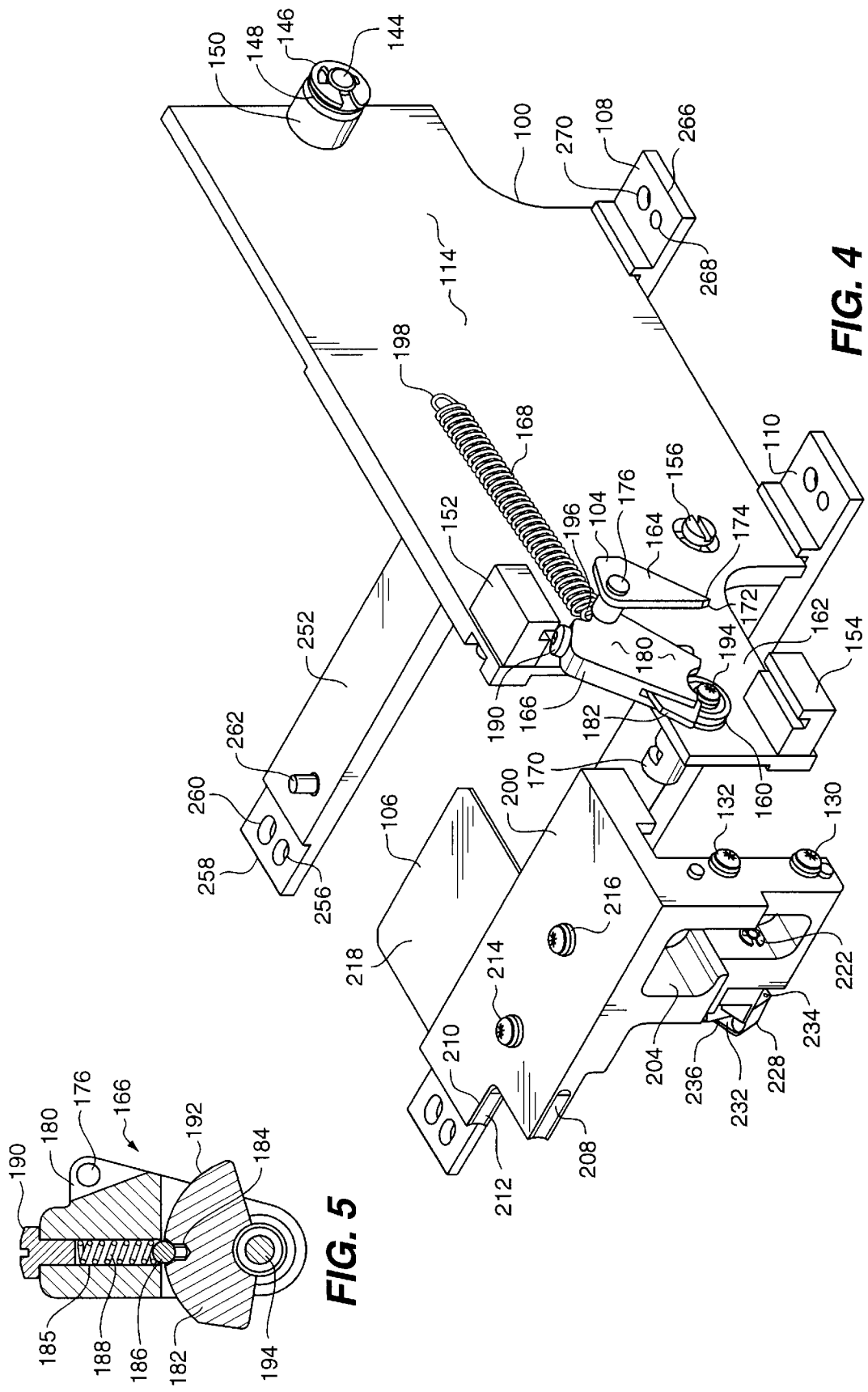

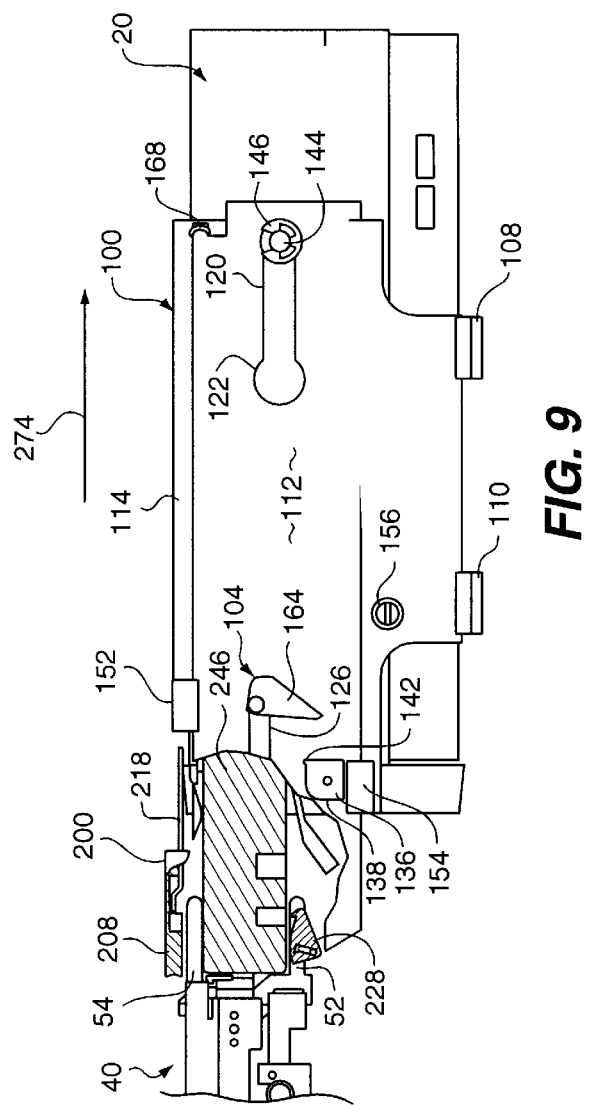
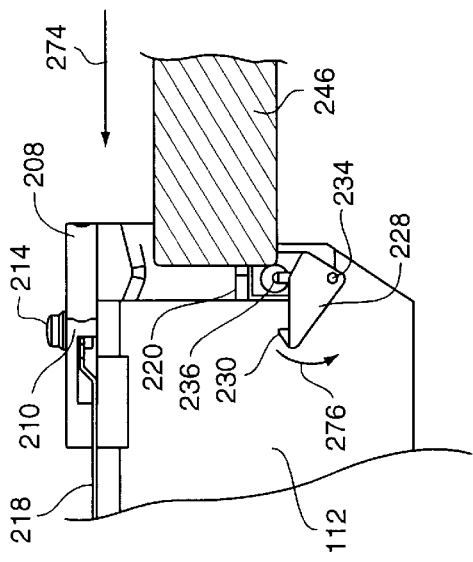
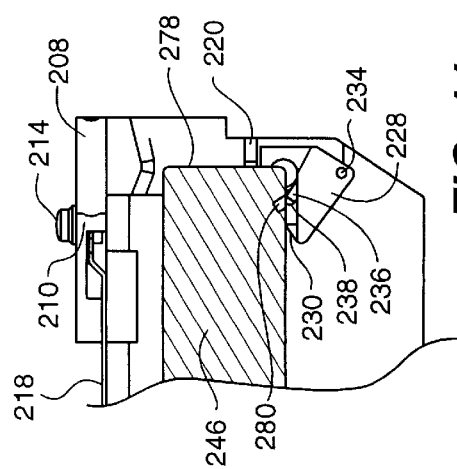
FIG. 9
FIG. 10
FIG. 11

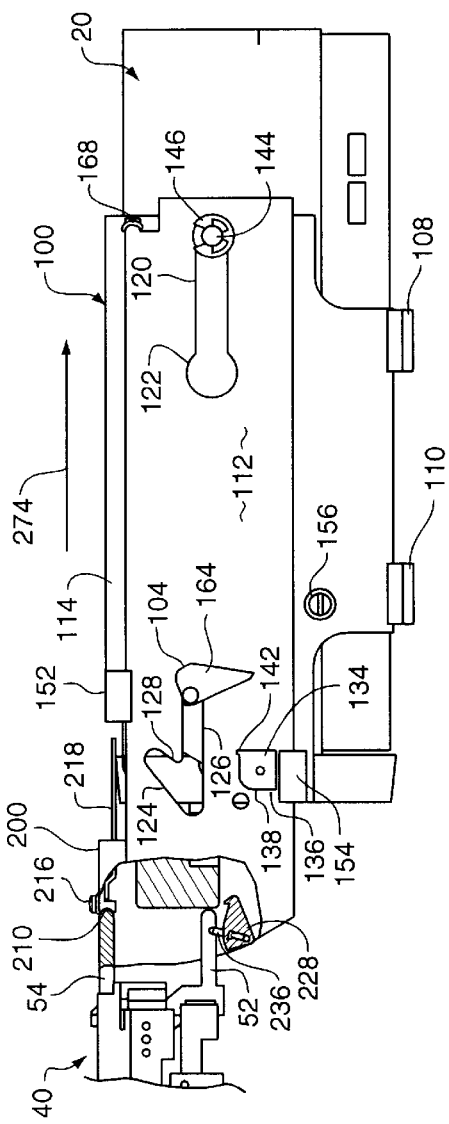
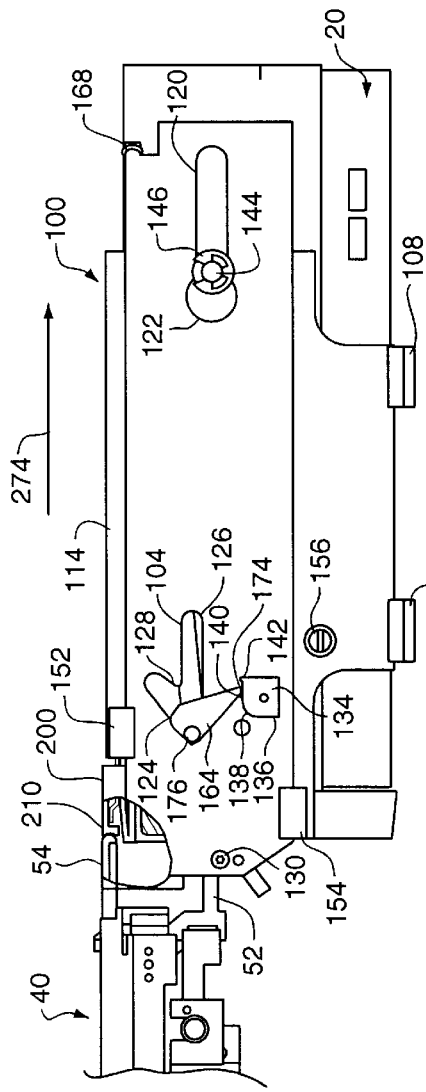
FIG. 12
FIG. 13

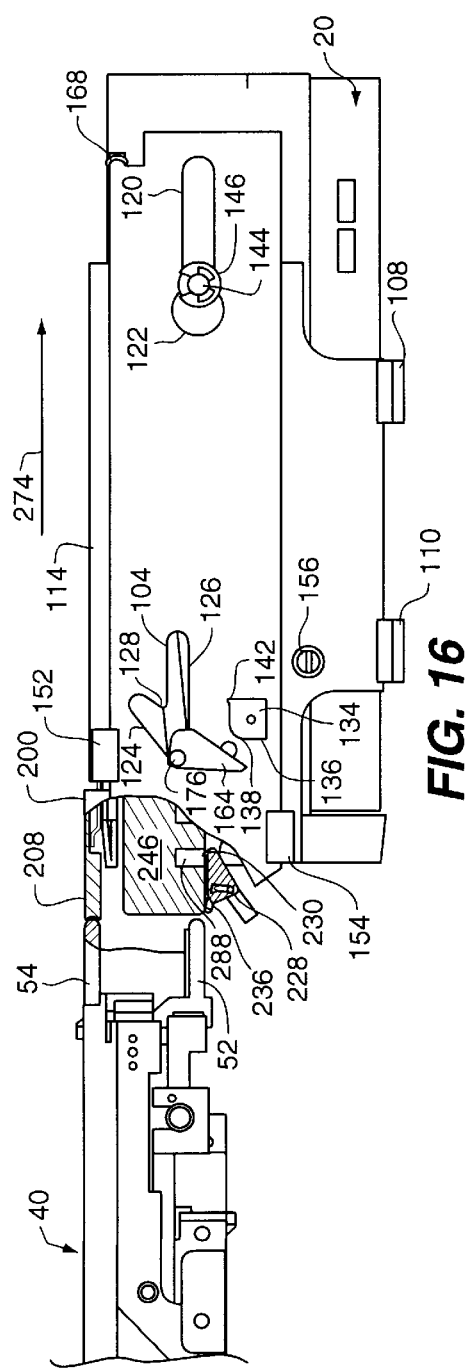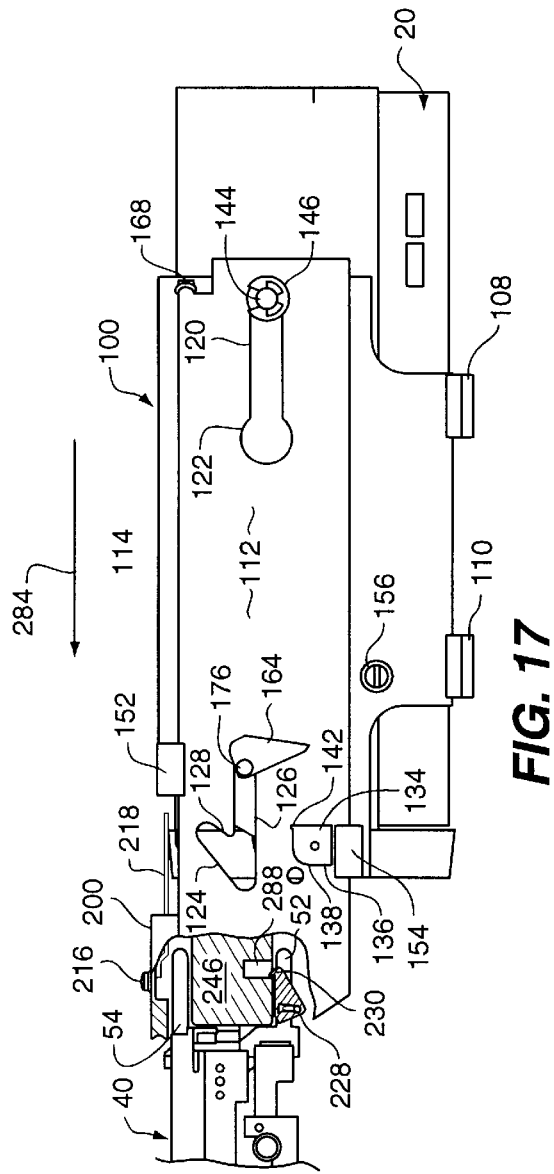

DATA CARTRIDGE SHUTTLE MECHANISM AND METHOD OF OPERATING THE SAME

BACKGROUND OF THE INVENTION

1. Field of the Invention

The present invention pertains to the field of robotic data storage and retrieval systems that transport data storage cartridges between cartridge storage locations and cartridge drive mechanisms which conduct read, write, and erase operations on the cartridges. More specifically, the cartridge drive mechanism is provided with a cartridge shuttle mechanism that facilitates robotic transfer of the data cartridge into and out of the drive mechanism.

2. Statement of the Problem

Robotic tape library systems provide reliable, low cost data storage and retrieval services. A plurality of data cartridges, e.g., cartridges containing spooled reels of magnetic tape, reside in their respective storage compartments for use as needed. A robotic arm is used to grasp a particular cartridge for transport to a cartridge drive mechanism or drive bay that is compatible with the cartridge. The drive mechanism conducts read, write, and erase operations on the cartridge. Examples of commercially available cartridge library systems include the 4400 and Wolfcreek library systems, which can be purchased from Storage Technology Corporation of Longmont, Colo.

The robotic arms of these systems move with great speed and precision, but finite limits exist as to the tasks that the arms can perform. A robotic arm sometimes cannot be made to access a particular cartridge drive mechanism because such access requires the robotic arm to perform simultaneous tasks, or because structure on the drive mechanism interferes with travel of the arm. Thus, drive mechanisms that are designed to accommodate a manually inserted cartridge often cannot be adapted for use in robotic library systems.

FIG. 1 depicts a manual tape drive 20 that is commercially available as one of the 2000, 4000, or 6000 Series drives from Quantum Corporation of Shrewsburg, Mass. Drive 20 includes a drive bay 22 having an interior tape-receiving compartment 24. A front, manually operated handle 26 is depicted in an extended position that permits frontal access to compartment 24. Handle 26 is attached to pivot rod 28 for pivoting movement of handle 26 along arrow 30 between the extended position as depicted and a downwardly retracted position where rearward surface 32 of handle 26 abuts lower forward surface 34 beneath drive bay 22. Pivoting of handle 26 towards surface 34 provides minor positional adjustments to a data cartridge (not depicted) that is to be placed in compartment 24, latches the cartridge within compartment 24 by moving internal components within compartment 24, unlocks a tape spool (not depicted) within the cartridge, and engages the drive motor with the tape spool. As depicted in FIG. 1, pivot rod 28 has a notch 36 that can receive torque for pivoting of handle 26 through pivot rod 28.

In the commercially available device, a user operates handle 26 between the respective extended and downwardly retracted positions. Drive 20 includes a conventional solenoid lock assembly 38 that locks handle 26 into the downwardly retracted position along arrow 30 while drive 20 conducts read and write operations on the data cartridge within compartment 24. This locking feature prevents untimely attempts to remove or insert a data cartridge into compartment 24, and is controlled by conventional electronic circuits within drive 20. Thus, a user places the data storage cartridge into compartment 24, operates handle 26 to close handle 26 and cause drive 20 to load the data storage cartridge. Upon completion of the cartridge read/write operation, the user pivots handle 26 to the extended position. This motion causes the drive 20 to eject the data storage cartridge to a position where the user can manually grasp the data cartridge and remove it from compartment 24.

FIG. 2 depicts a robotic hand 40 that is commercially available from Storage Technology Corporation of Longmont, Colo., as a component in a robotic data cartridge library system. Robotic hand 40 is normally connected to the end of a conventional robotic arm (not depicted). Hand 40 includes a robotic eye 42 that scans targets for positional alignment or adjustment of hand 40. A belt-driven pulley wheel is used to extend and retract a cartridge-grasping assembly 46 between forward and rearward positions. Assembly 46 includes four outwardly extending fingers 48, 50, 52, and 54. A horizontally elongated cartridge backstop 56 is mounted in the recessed area between the respective fingers to place fingers 48 and 54 above backstop 56 while placing fingers 50 and 52 below backstop 56. A pair of opposed cartridge-grasping paddles 58 and 60 can be pivoted up and down along the direction of arrow 62 for grasping and releasing data cartridges (not depicted) that are positioned between the fingers 48–54. Paddles 58 and 60 grasp the cartridge with sufficient force to prevent the cartridge from becoming dislodged from hand 40 while hand 40 moves the cartridges from one position to another.

It has heretofore been impossible to use hand 40 (FIG. 2) for inserting a data cartridge into drive 20 (FIG. 1) and then removing the cartridge. One problem is that fingers 50 and 52 of hand 40 (FIG. 2) will contact the extended handle 26 of drive 20 (see FIG. 1) in a manner that precludes full insertion of the data cartridge into compartment 24. In the robotic cartridge insertion operation, the data cartridge must be released to compartment 24, the robotic hand moved up, and the data cartridge must be pushed in by fingers 50 and 52. Finally, the handle must be lowered to the downwardly retracted position proximal to surface 34. It is impossible to perform these operations because structure on drive 20 contacts and interferes with the required motion of robotic hand 40, e.g., as fingers 50 and 52 or paddle 58 contact handle 26. Yet another problem arises when drive 20 has finished interacting with the data cartridge. Robotic hand 40 is required to raise handle 26 to the extended position shown in FIG. 1, for ejection and removal of the data cartridge. Even if robotic hand 40 succeeds in raising handle 26, the ejected cartridge remains partial received within compartment 24 at a position that precludes paddles 58 and 60 from grasping the data cartridge. These problems prevent the use of drive 20 in a robotic library system.

There remains a true need for a device that can be used to adapt manual cartridge drive mechanisms for use in robotic systems.

SOLUTION

The present invention overcomes the problems outlined above by providing a data cartridge shuttle apparatus that adapts a manual cartridge drive mechanism for use in robotic library systems. The data cartridge shuttle apparatus can be provided as an after market retrofit assembly, or the apparatus can be provided at the factory.

The data cartridge shuttle apparatus is used as an intermediary transfer device to facilitate the robotic transfer of a data cartridge to and from a drive mechanism in a robotic data cartridge library. The apparatus uses the drive bay itself to support a data storage cartridge against the force of gravity after a robotic hand partially inserts the cartridge into the drive bay. A slide member responds to contact from the robotic hand to lower and raise handle 26 for cartridge insertion and subsequent removal operations. In cartridge removal operations, the slide member also carries the cartridge to a forward position where the robotic hand can grasp the cartridge without interference from structure on drive 20. A pawl and lever linkage rotates the drive handle 26 through pivot rod 28 to engage and disengage the data cartridge from the drive mechanism. Thus, the shuttle apparatus and robotic arm or robotic hand replace the user of the manual drive 20 (see FIG. 1).

The robotic arm and tape shuttle apparatus work together to place the data storage cartridge into compartment 24, pivot rod 28 to close handle 26 and cause the drive 20 to load the data storage cartridge. The slide member responds to additional contact from the robotic hand by interaction with a pawl and lever linkage that raises handle 26 to disengage the cartridge from the drive bay and remove the cartridge to a location where the robotic hand can grasp the cartridge. Upon completion of the cartridge read/write operation, the robotic arm and tape shuttle apparatus pivots rod 28 to open raise handle 26 and cause the drive 20 to eject the data storage cartridge to a position where the slide member can shuttle the cartridge to a position where robotic hand 40 can grasp the data cartridge and remove it from compartment 24.

In preferred embodiments, the shuttle apparatus includes a torsion breakover wing as part of the pawl and lever linkage. The breakover wing prevents damage to pivot rod 28 in the event of a mechanical malfunction due to attempted operation of the apparatus when drive 20 is not ready, i.e., when solenoid lock mechanism 38 is engaged to retain the cartridge within compartment 24. The slide member preferably includes a rotatable clasp assembly that permits sliding movement of the data cartridge into the cartridge drive bay through the slide member. The clasp assembly also contacts the data cartridge to remove the data cartridge from the drive bay concomitant with movement of the slide member. The slide member preferably includes an opening that contacts the pawl and lever linkage for actuation of components within the drive mechanism.

The shuttle apparatus is operated according to a method that begins by grasping a data cartridge by the action of a robotic arm. The arm transfers the data cartridge to a partially received position within compartment 24. The robotic arm releases the data cartridge before the cartridge is fully inserted into compartment 24. After having released the data cartridge, the robotic arm moves up to push the data cartridge into the drive bay of the cartridge drive mechanism. This actuation fully inserts the data cartridge into operational alignment with the cartridge drive mechanism. At the same time, the robotic arm depresses the slide member and, as the robotic arm moves away after having inserted the cartridge, the slide member reverses direction under the force of spring bias to rotate the pawl and lever linkage which, in turn, rotates rod 28 to close handle 26.

The robotic arm is free to conduct other tasks while the drive mechanism 20 conducts read, write, and erase operations on the data cartridge. The robotic arm returns to the drive mechanism at the conclusion of read, write and erase operations, in order to remove the cartridge from compartment 24. The robotic arm contacts the tape shuttle apparatus to move the slide assembly in a manner that provides camming action against the pawl and lever linkage. The camming action rotates the pawl and lever linkage which, in turn, rotates rod 28 to open handle 26 and disengage the data cartridge from drive 20. The rotatable clasp assembly connects with the data cartridge, and is used to pull the cartridge from within drive bay compartment 24 under the force of a spring bias on the slide mechanism to a position where the robotic hand can grasp the cartridge.

In even more preferred embodiments, the robotic hand includes vertically moving paddles like paddles 58 and 60 as depicted in FIG. 2.

Other salient features, objects, and advantages of the present invention will be apparent to those skilled in the art upon a reading of the discussion below in combination with the accompanying drawings.

BRIEF DESCRIPTION OF THE DRAWINGS

FIG. 4 depicts a top right front perspective view of the FIG. 3 cartridge shuttle apparatus without the FIG. 1 data cartridge drive mechanism attached thereto, wherein an outer sliding plate member is removed to reveal interior details that include a pawl and lever linkage;

FIG. 5 depicts a right side elevational section view of a portion of the FIG. 4 pawl and lever assembly that reveals a torsion breakover wing held in position by a spring detent;

FIG. 9 depicts a right side elevational midsection view of a robotic arm inserting a data cartridge into the cartridge shuttle apparatus of FIG. 3;

FIG. 10 depicts a left side elevational view of a data cartridge being inserted into the data cartridge shuttle apparatus of FIG. 3;

FIG. 11 depicts a left side elevational view like that of FIG. 10, but with the data cartridge being inserted a greater distance into the data cartridge shuttle apparatus;

FIG. 12 depicts a right side elevational view of a robotic arm contacting the data cartridge shuttle assembly of FIG. 3 to complete the insertion of the data cartridge into the shuttle apparatus;

FIG. 13 depicts a right side elevational view showing movement of the data cartridge shuttle apparatus in response to contact from the robotic arm at a time subsequent to the contact depicted in FIG. 12;

FIG. 16 depicts a right side elevational view of the cartridge shuttle apparatus as the robotic hand continues rearward motion at a position subsequent to the position shown in FIG. 15; and FIG. 17 depicts a right side elevational view of the cartridge shuttle apparatus as the robotic hand removes the data cartridge at a position subsequent to the position shown in FIG. 16.

DETAILED DESCRIPTION OF THE PREFERRED EMBODIMENT

Figure 1:
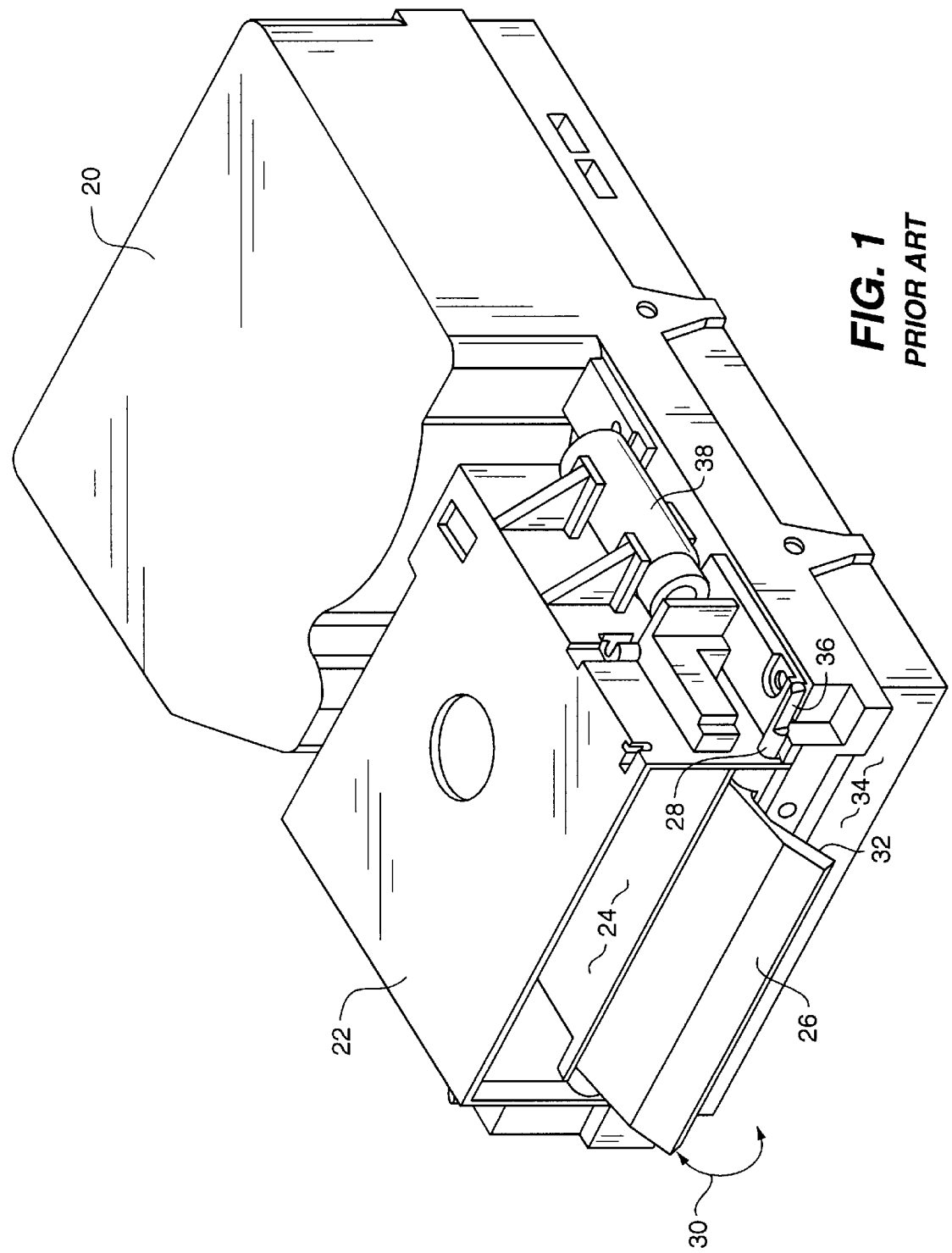
FIG. 1 depicts a top right front elevational perspective view of a commercially available data cartridge drive mechanism without a cartridge shuttle apparatus according to the present invention, and without a front bezel.
Figure 3:
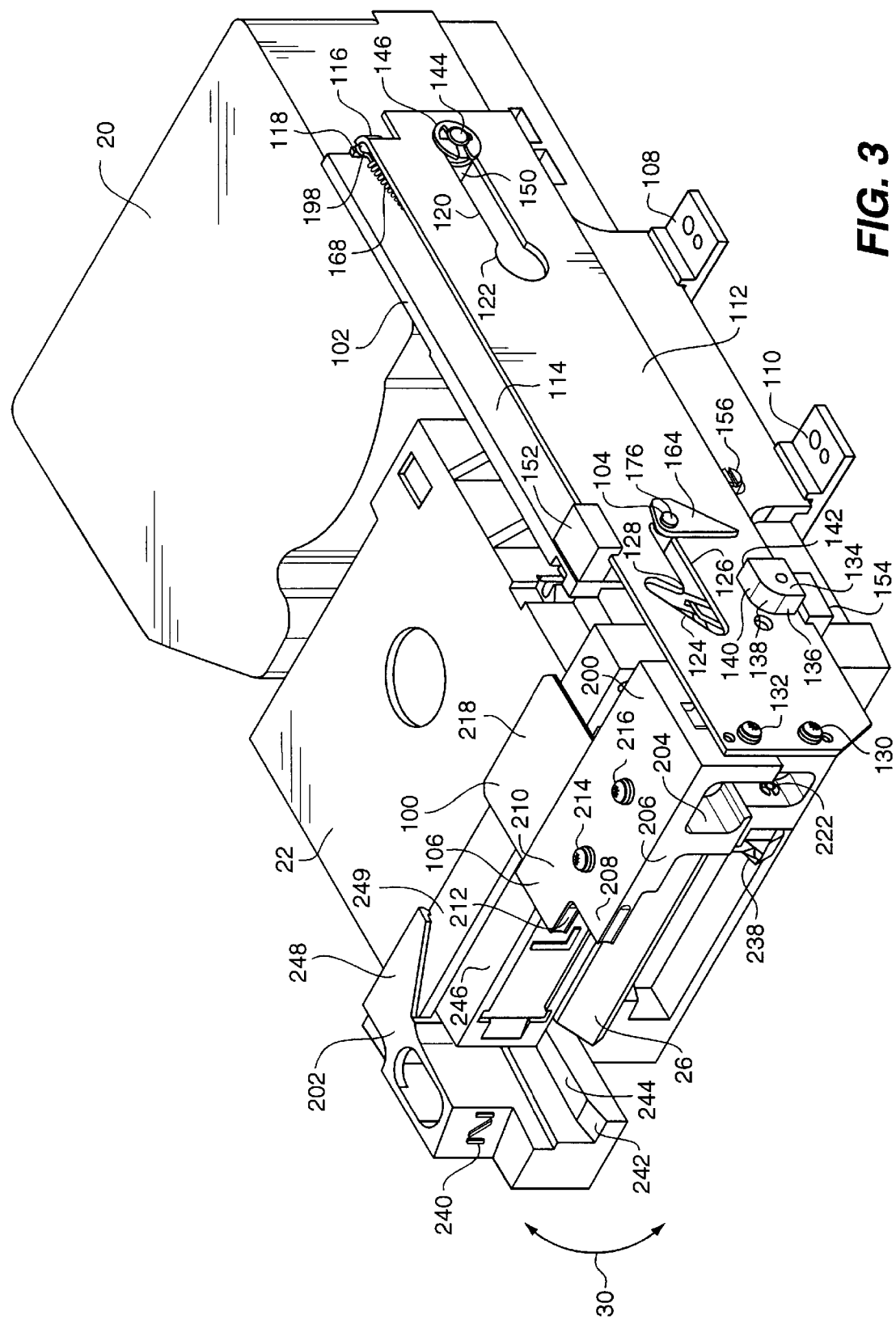
FIG. 3 depicts a top right front elevational perspective view of the FIG. 1 data cartridge drive mechanism that has been provided with an additional cartridge shuttle apparatus according to the present invention.

FIG. 3 depicts the prior art data cartridge drive mechanism 20 of FIG. 1 after it has been modified to accept a metal data cartridge shuttle apparatus 100 according to the present invention. The major components of cartridge shuttle apparatus 100 include a slide support assembly 102, a pawl and lever linkage 104, a slidable block and plate assembly 106, and mounting brackets 108 and 110.

Slide support assembly 102 includes an outer metal plate member 112 and an inner metal plate member 114. Outer metal plate member is flat except for a rearward inwardly bent nib 116 having a spring-receiving notch 118. The rearward portion of plate member 112 has a rearwardly elongated slide opening 120 including a circular forward portion 122. The forward portion of plate member 112 has a forward-pointing V-shaped opening including an upper camming surface 124, a horizontal lower sliding surface 126, and a central retaining protrusion 128. Plate member 112 is attached to slidable block and plate assembly 106 by machine screws 130 and 132. A pawl stop 134 is rigidly affixed to plate member 112. Pawl stop 134 rises outwardly to the side of plate member 112 at a position proximal to pawl and lever linkage 104. Pawl stop 134 includes a vertical forward face 136 leading to a rounded corner 138 and horizontal upper face 140. The rearward portion of pawl stop 134 includes an upwardly raised pawl catch 142.

FIG. 4 depicts the data cartridge shuttle apparatus 100 of FIG. 3 with outer plate member 112 and cartridge drive mechanism 20 removed to reveal details of inner plate member 114 that are hidden in the FIG. 3 perspective. Inner plate member 114 includes a rearward pin 144 that is notched at its outer end to receive a circular spring retaining clip 146. Clip 146 has a diameter that exceeds the height of opening 120 and circular portion 122 (see FIG. 3) to retain outer plate member 112 in a gap 148 intermediate clip 146 and collar 150. The forwardmost upper corner of inner plate member 114 includes a first slotted guide 152 that accommodates outer member 112 (see FIG. 3). The forwardmost lower corner of plate member 114 includes a second slotted guide 154 that also accommodates outer plate member 112 in opposition to the first slotted guide 152. Inner plate member 114 is apertured to receive a shoulder screw 156 that connects plate member 114 to a corresponding aperture in drive mechanism 20 (not depicted in FIG. 4), thereby rigidly affixing inner plate member 114 to drive mechanism 20. Pawl and lever linkage 104 passes through an aperture in inner plate member 114 at position 160 on the forwardly extending tongue 162 of inner plate member 114.

FIG. 4 also depicts pawl and lever linkage 104, which includes a generally triangular pawl 164, a spring release lever 166, a coiled tension spring 168, and torque collar 170. Pawl 164 is preferably a metal plate having a lower bevel 172 leading to point 174. Pawl 164 is rotatably attached to lever 166 by pin 176 to allow rotation of pawl 164 with respect to lever 166.

FIG. 5 is a sectional view of spring release lever 166 that provides additional detail not shown in the FIG. 4 perspective. Lever 166 includes main body 180, which is slotted to receive a separate break-wing 182 having central detent 184. Main body 180 includes a cylindrical chamber 185 containing a detent-engaging ball 186 and a coiled compression spring 188 that is biased into ball 186 by machine screw 190. Main body 180 is free to rotate with respect to break-wing 182 once ball 186 has been forced from detent 184 to ride along surface 192 to the sides of detent 184. Break-wing 182 is apertured to receive machine screw 194, which fixedly couples break-wing 182 with collar 170 through inner plate member 114 (see FIG. 4).

Returning now to FIG. 4, front loop 196 of tension spring 168 is attached to pin 176 to exert a rearward pull on pawl and lever assembly 104. Rear loop 198 of spring 168 slips into notch 118 of spring-receiving nib 116 (see FIG. 3) to exert a corresponding forward bias on outer plate member 112.

Figure 6:
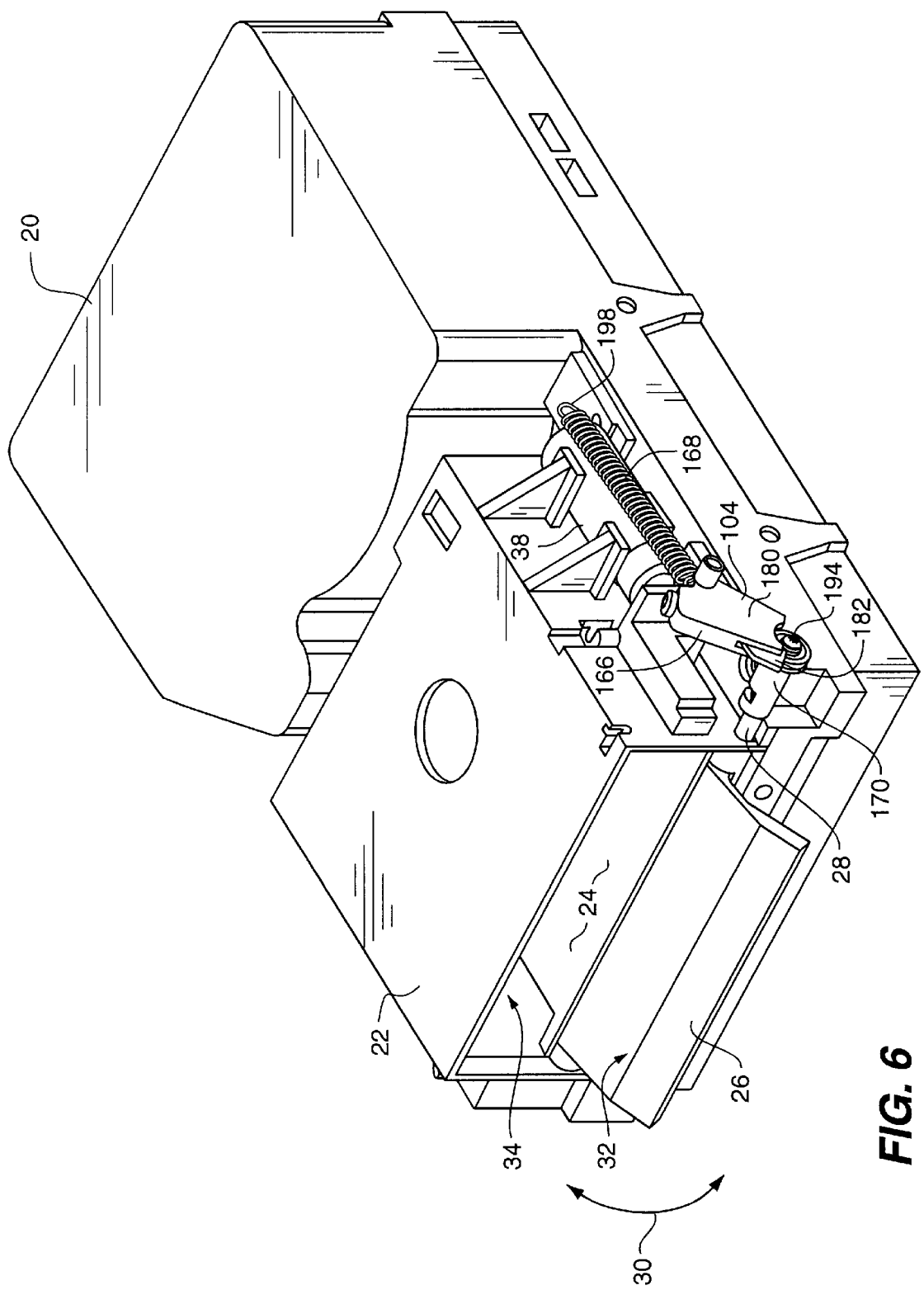
FIG. 6 depicts a top right front elevational perspective view of the FIG. 1 drive mechanism attached to the pawl and lever assembly of FIG. 4.

In FIG. 6, slide support assembly 102 has been removed to better illustrate the details of the connection between pawl and lever linkage 104 and drive mechanism 20. FIG. 6 depicts pawl and lever assembly 104 connected to pivot rod 28 of drive mechanism 20 for actuation of handle 26 as indicated by arrow 30.

Figure 2:
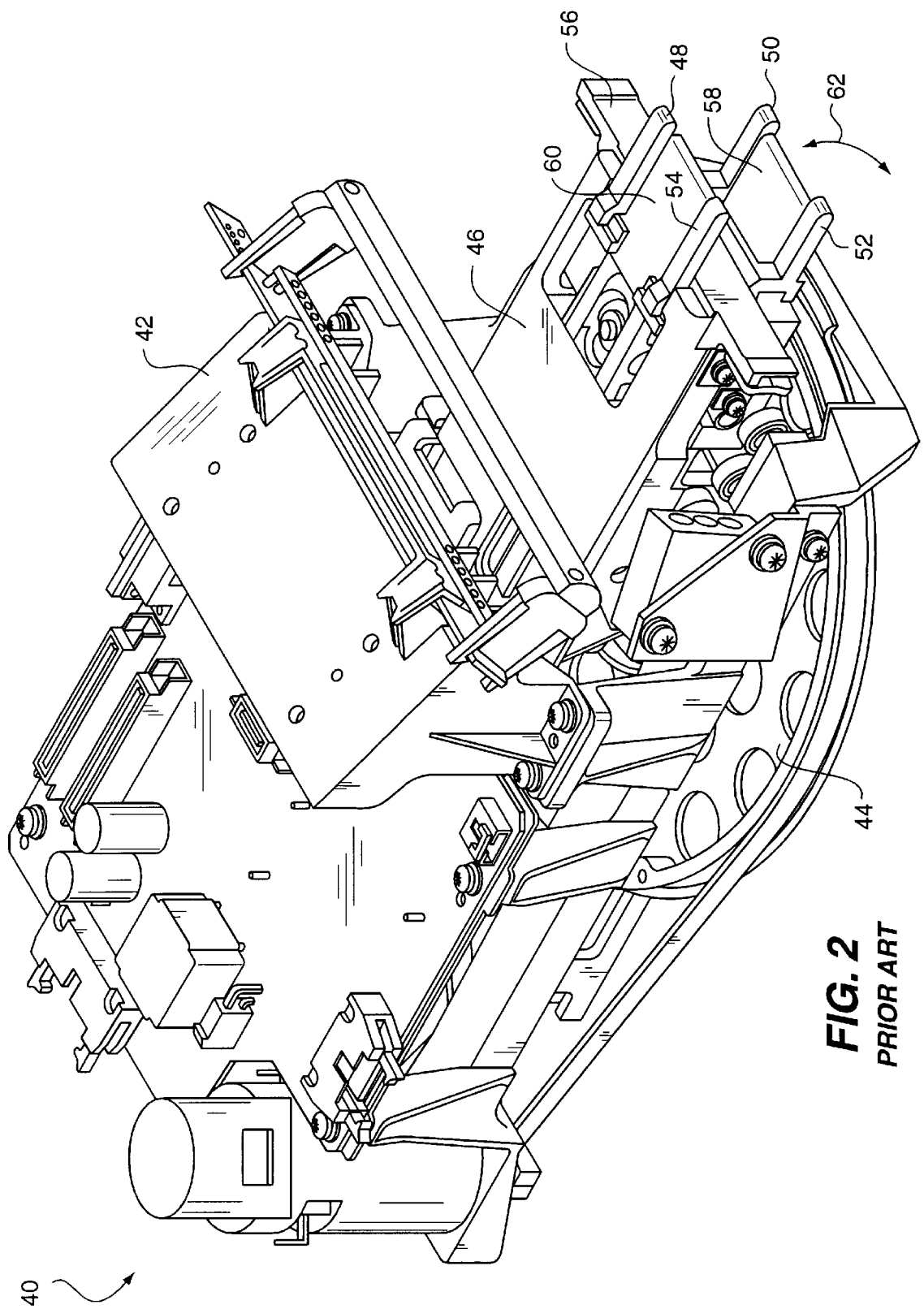
FIG. 2 depicts top left front elevational perspective view of a commercially available robotic hand for use in a data cartridge library system.
Figure 7:
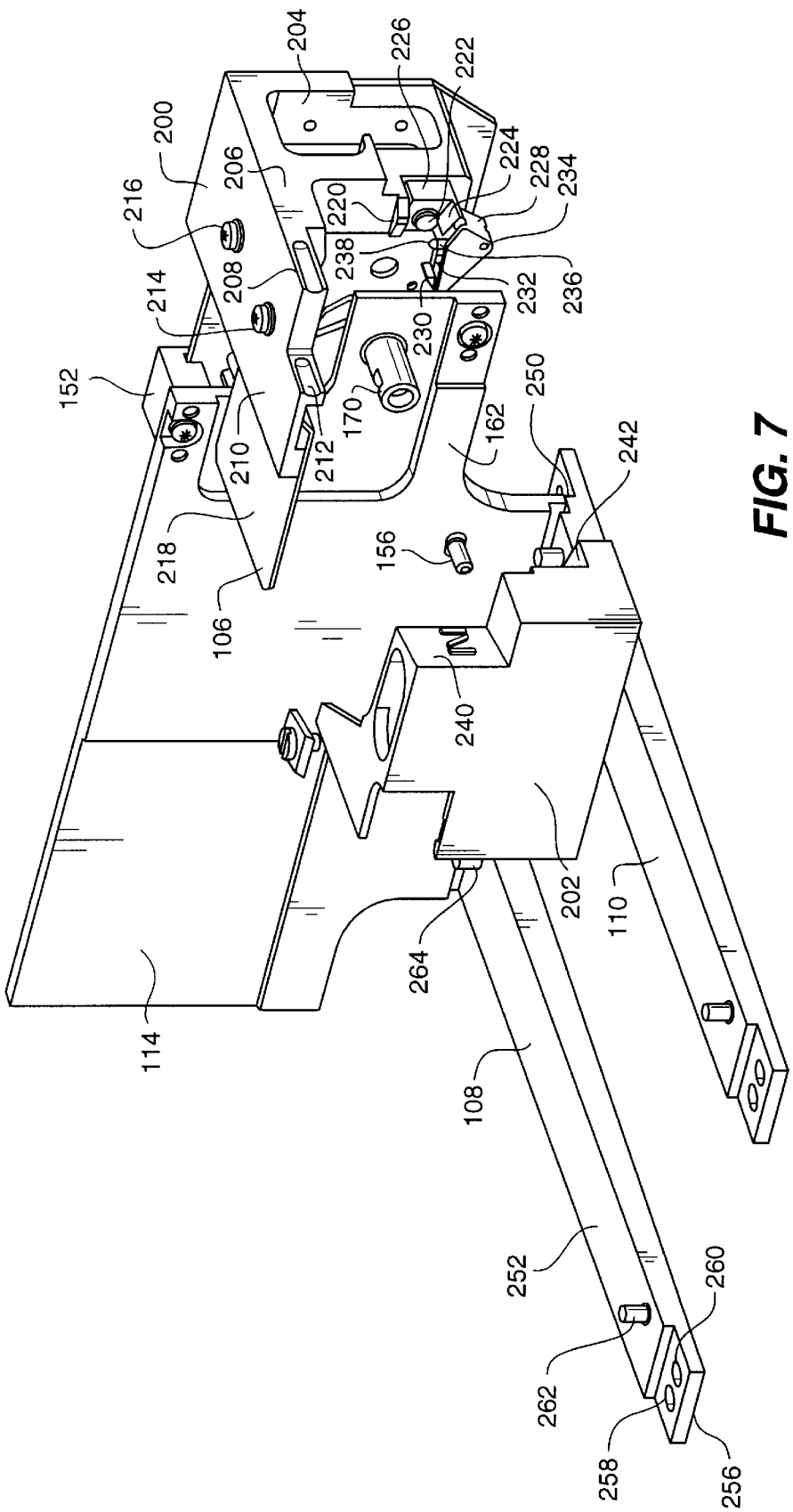
FIG. 7 depicts a top left front elevational perspective view of the FIG. 3 cartridge shuttle apparatus without the FIG. 1 drive mechanism attached thereto.
Figure 8:
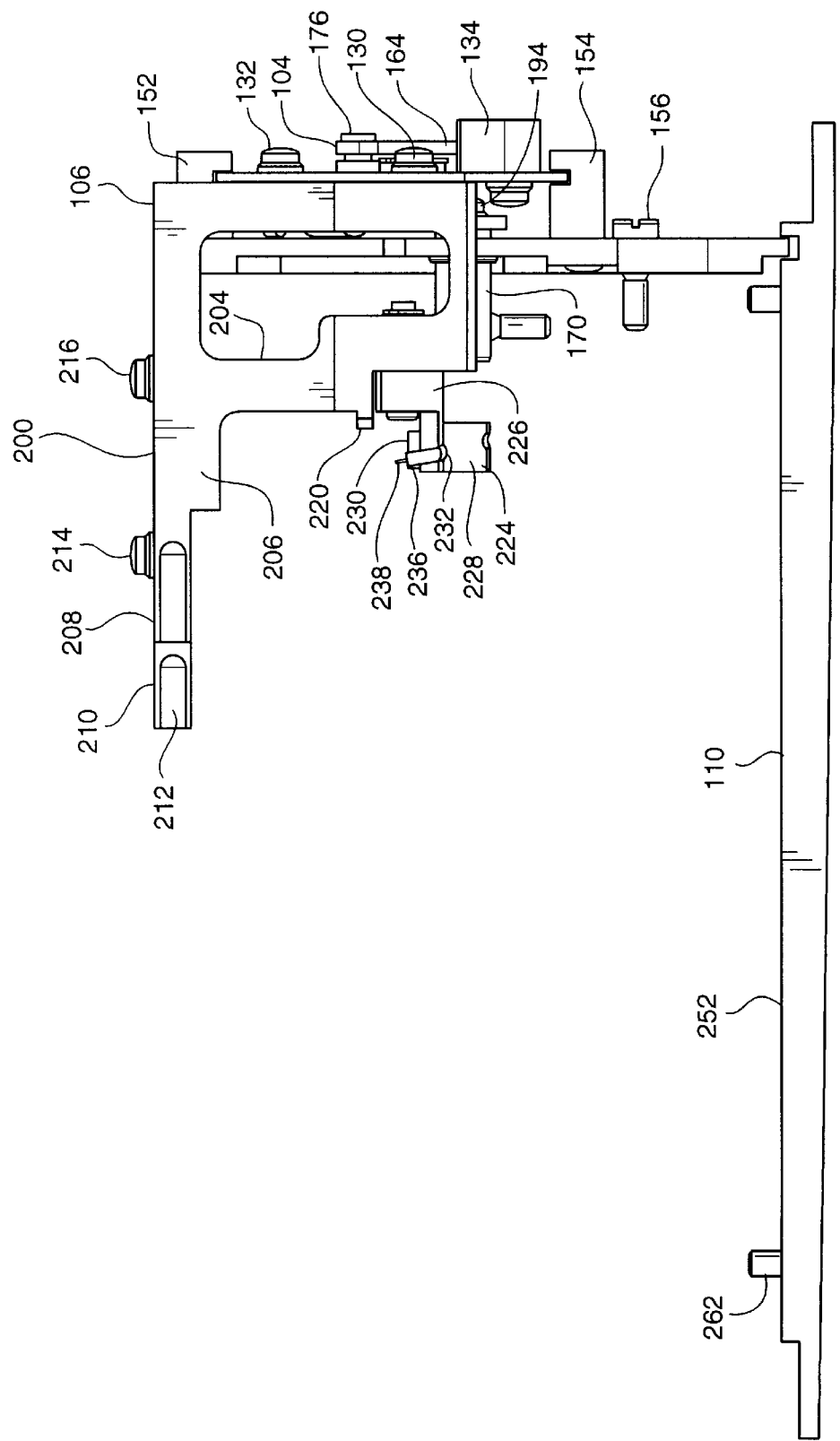
FIG. 8 depicts a front elevational view of the FIG. 7 drive mechanism.

FIG. 7 depicts slidable block and plate assembly 106, which includes shuttle block 200 in combination with an optional fixed target block 202. FIG. 8 is used to show additional details of shuttle block 200. Shuttle block 200 has a central cavity 204. The upper portion of shuttle block 200 has an inwardly extending ledge 206 including a first finger rest 208 and second finger rest 210 having a lesser rearward depth extent than first finger rest 208. Both of the finger rests 208 and 210 are provided with a rearwardly concave groove, e.g., groove 212, for use in contacting fingers of a robotic hand such as fingers 48–54 of FIG. 2. Machine screws 214 and 216 couple a rearwardly extending horizontal plate 218 (see FIG. 7) with ledge 206.

The lower portion of shuttle block 200 includes cartridge guide rib 220, which is raised inwardly and elongated in a rearward direction. Beneath rib 220, pin 222 connects spring cartridge clasp assembly 224 to shuttle block 200 at a position just beneath guide rib 220. Clasp assembly 224 includes a square pin-collar segment 226 that is integrally formed with a triangular clasp segment 228. The rearward portion of clasp segment 228 includes an upwardly pointing clasp bevel 230 and a rearwardly elongated central spring-receiving groove 232. Retaining pin 234 (FIG. 7) connects coil spring 236 to clasp segment 228. Upper end 238 of spring 236 is free to move concomitant with flexion in spring 236.

Target block 202 is best represented by the perspective of FIG. 3. Target block 202 includes a conventional target face 240 that can be accessed by a robotic eye for positional alignment of a robotic hand, such as robotic eye 42 of FIG. 2. Target block 202 includes a forward cartridge guide ramp 242 leading to an upper surface 244 that is used to contact and support a data cartridge 246. Target block 202 does not slide with shuttle block 200, but works in opposition to shuttle block 200 for the support of data cartridge 246. Target block 202 has an integral support bracket 248 that is used to hang target block 202 in a fixed position with respect to drive mechanism 20. Bracket 248 is fixedly attached to a front bezel 249 on drive 20.

Mounting brackets 108 and 110 are identical with respect to one another, and are best represented by the perspective of FIG. 7. Each bracket is formed with a groove, e.g., groove 250, that receives the lowermost portion of inner plate member 114. As in the case of bracket 108, each mounting bracket includes a downwardly slanted bevel 252 leading to a flattened end 256 including a pair of apertures 258 and 260 that receive a threaded fastener (not depicted) for use in mounting bracket 108 to a corresponding frame (not depicted) in a data cartridge library system. Bracket 108 is also apertured to receive machine screws 262 and 264, which couple bracket 108 with corresponding holes in drive 20 (not depicted in FIG. 7). FIG. 4 shows that bracket 108 includes flattened end 266 which is remote from end 256 and includes apertures 268 and 270 for use in mounting bracket 108 to a corresponding frame (not depicted) in the data cartridge library system.

Shuttle Apparatus Operation—Cartridge Load Sequence

FIGS. 9–17 depict cartridge shuttle apparatus 100 in operation. FIG. 9 is a right side elevational view depicting the robotic insertion of cartridge 246 into drive mechanism 20 and cartridge shuttle apparatus 100 by robotic hand 40. A forward portion of slide member 112 has been removed to reveal parts of robotic hand 40 and data cartridge 246. The position of pawl 164 indicates that handle 26 is held open, as depicted in FIG. 3. Robotic hand 40 is moving in the direction of arrow 274. Robotic hand 40 releases cartridge 246 to shuttle apparatus 100 after partially inserting cartridge 246 into drive mechanism 20, as depicted in FIG. 3. Thus, the drive mechanism 20 supports and holds the cartridge 246 independently of robotic hand 40, and maintains cartridge 246 in position for subsequent loading into drive mechanism 20.

FIGS. 10 and 11 depict the partial insertion of cartridge 246 into drive mechanism 20 from a left side midsection perspective. In FIG. 10, cartridge 246 contacts spring 236 to rotate clasp segment 228 slightly downward in the direction of arrow 276. Further insertion occurs according to FIG. 11 until the rear end 278 of cartridge 246 is just above pin 234. Spring 236 is bent towards clasp bevel 230, which causes bevel 230 to be forced away from and out of engagement with cartridge 246. Spring 236 bends underneath cartridge 246 with upper end 238 of spring 230 pointing towards drive 20. The position shown in FIG. 11 is the same as that shown in the FIG. 3 perspective. Now that the cartridge is positioned, robotic hand 40 must contact shuttle apparatus 100 to rotate rod 28.

FIG. 12 depicts robotic hand 40 in a second insertion movement subsequent to having released cartridge 246 as shown in FIG. 3. Robotic hand 40 has moved rearwardly and upwardly with respect to drive mechanism 20 from the position shown in FIG. 9. Finger 52 is contacting cartridge 246, and finger 54 is contacting finger rest 210 of shuttle block 200. Robotic hand 40 is moving in the rearward direction of arrow 274 against the bias of spring 168 (see FIG. 4). Cartridge 246 has moved forwardly to disengage from contact with spring 236. Thus, cartridge 246 is being fully inserted into drive mechanism 20.

FIG. 13 depicts robotic hand 40 at the point of maximum movement in the direction of arrow 274. Pawl 164 has traveled over pawl stop 134 to rotate pawl 164 in a counterclockwise direction determined with respect to the position of pawl 164 in FIG. 12. Pin 176 abuts the forwardmost position of camming surface 124. Robotic hand 40 subsequently moves in a rearward direction opposite arrow 274 to disengage finger 54 from finger rest 210, and is free to perform other tasks while drive mechanism 20 interacts with cartridge 246.

Figure 14:
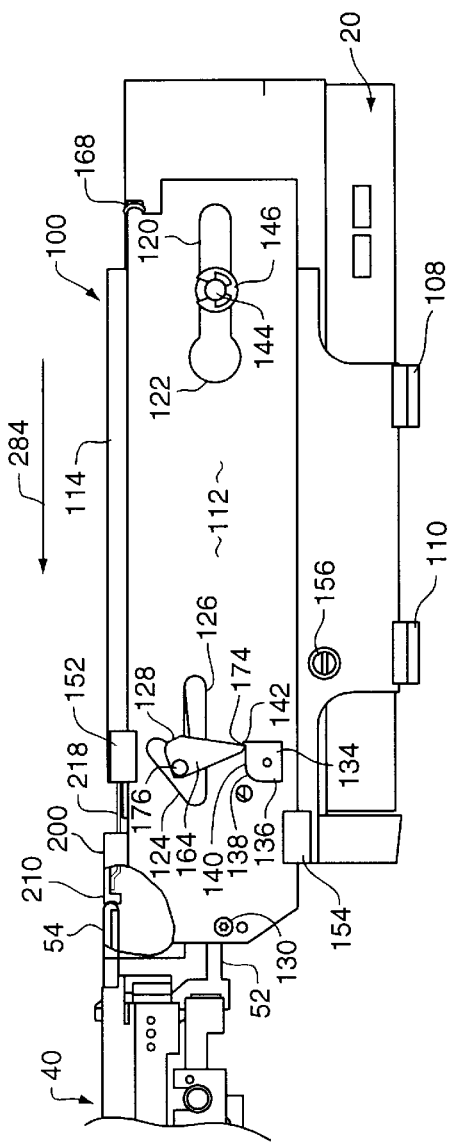
FIG. 14 depicts a right side elevational view of the data cartridge shuttle apparatus lowering the drive mechanism handle subsequent to the contact depicted in FIG. 13.

FIG. 14 depicts the movement of data cartridge shuttle apparatus 100 as robotic hand 40 moves rearwardly to disengage finger 54 from finger rest 210. Outer plate member 112 moves in the direction of arrow 284 due to the bias of spring 168. Point 176 of pawl 164 contacts pawl catch 142. Pin 176 and pawl 164 are forced upwardly against the upper surface of retaining protrusion 128. This movement uses lever 166 (see FIG. 5) to rotate pivot rod 28 and lower handle 26 (see FIG. 3) for engagement of cartridge 246 within compartment 24 of drive mechanism 20. Pin 176 abuts retaining protrusion 128 in a position opposite camming surface 124 to lock cartridge shuttle apparatus 100 in a fixed position against the bias of spring 168 while drive mechanism 20 interacts with cartridge 246. Further forward movement of robotic hand 40 in the direction of arrow 284 completes the rotation of pivot rod 28 by raising pin 176 further up retaining protrusion 128, and eventually disengages finger 54 from finger rest 210. Thus, cartridge 246 is fully loaded into compartment 24, and robotic hand 40 is free to pursue other tasks.

Shuttle Apparatus Operation—Cartridge Unload Sequence

Figure 15:
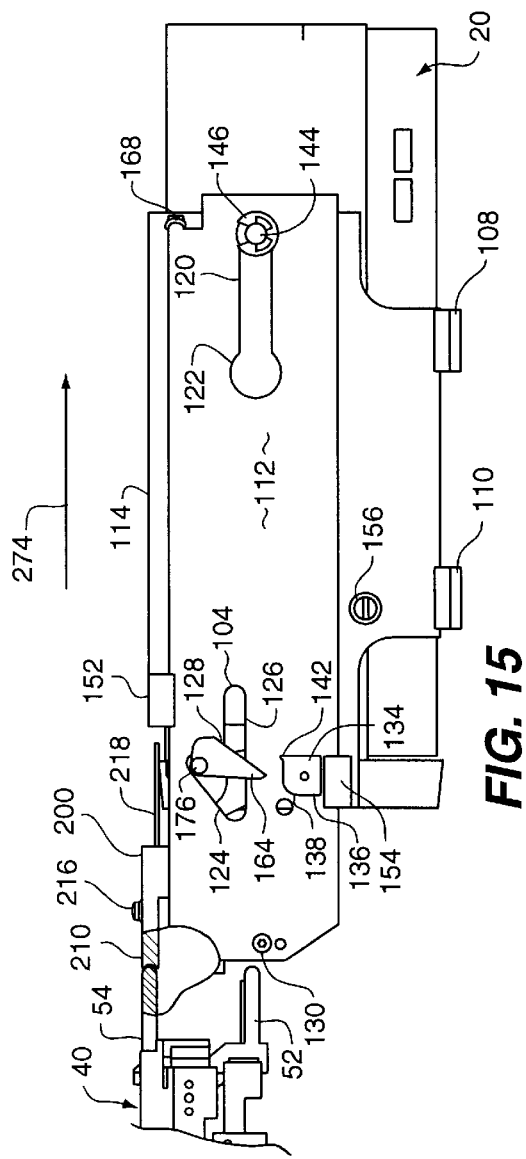
FIG. 15 depicts a right side elevational view of the cartridge shuttle apparatus as the robotic arm returns to the shuttle apparatus for removal of the data cartridge.

Once drive 20 is finished conducting read, write, and erase operations on cartridge 246, robotic hand 40 returns to drive mechanism 20 for the unloading of cartridge 246 from compartment 24. Robotic hand 40 and tape shuttle apparatus work together to disengage cartridge 246 from drive mechanism 20. FIG. 15 depicts finger 54 of robotic hand 40 contacting finger rest 208 as hand 40 is causing cartridge shuttle outer plate member 112 to move rearwardly in the direction of arrow 274 against the bias of spring 168. This movement causes the portion of pin 176 inboard of pawl 164 to abut camming surface 124 for sliding engagement against surface 124. The camming action against surface 124 lowers pin 176 and pawl 164, which work through lever 166 (see FIG. 5) to rotate pivot rod 28 in a clockwise direction to raise handle 26 (see FIG. 3) into a forwardly extended position. The raising of handle 26 disengages cartridge 246 from drive mechanism 20.

FIG. 16 depicts robotic hand 40 as it continues to move in the rearward direction of arrow 274. The raising of handle 26 and corresponding disengagement of cartridge 246 from drive mechanism 20 causes drive mechanism 20 to move cartridge 246 forwardly from within compartment 24. The continued rearward motion of robotic hand 40 and outer plate member 112 serves to push clasp 228 beneath cartridge 246. Spring 236 contacts cartridge 246 to bias bevel 230 into engagement with a lower notch 288 that is an integral part of cartridge 246. Robotic hand 40 subsequently reverses its motion to travel opposite the direction of arrow 274. The bias of spring 168 forces outer plate member 112 to move in a direction opposite arrow 274. Clasp 228 engages notch 288 through bevel 230, and pulls cartridge 246 in a forward direction opposite arrow 274 as pin 176 slides along surface 126. Further forward movement of robotic hand 40 in a direction opposite arrow 274 serves to disengage finger 54 from finger rest 208. Thus, the forwardmost portion of cartridge 246 is moved a sufficient distance forward of drive mechanism 20 to permit grasping of cartridge 246 by robotic hand 40.

FIG. 17 depicts robotic hand 40 after it has moved rearwardly to disengage finger 54 from finger rest 208, moved downwardly to position cartridge 246 at a level between fingers 52 and 54, and moved forwardly to place cartridge 246 fully between fingers 52 and 54. Paddles 58 and 60 (see FIG. 2) are closed against cartridge 246, and robotic hand 40 moves rearwardly in the direction of arrow 284 to completely withdraw cartridge 246 from drive mechanism 20. Robotic hand 40 subsequently deposits cartridge 246 in a cartridge storage location.

As indicated above, the purpose of the torsional breakover wing 182 depicted in FIG. 5 is to prevent damage to pivot rod 28 in the event that attempts are made to actuate shuttle apparatus 100 when the internal components of drive mechanism 20 are locked. This type of actuation normally occurs as a result of human error during maintenance of the robotic library system. Machine screw 190 is tightened to engage compression spring 188 forcing ball 186 into detent 184. When the torque transmitted to screw 194 through breakover wing 182 and main body 180 exceeds about five to ten foot pounds, ball 186 is forced upward against the bias of spring 188 to ride on surface 192. Lever 166 then assumes a bent configuration that prevents twisting or breakage rod 28.

It will be understood that shuttle mechanism 100 may be modified along the same principles disclosed above to accommodate any variety of different data cartridges for use with their corresponding drive mechanisms in robotic library systems. For example, data cartridge 246 could be an optical disk cartridge or and optical tape cartridge. The control of robotic hand 40 is accomplished by conventional computerized control devices that are inherent features of a commercially available robotic library system. Implementation of these control features is well within the ability of those skilled in the art.

Those skilled in the art will understand that the preferred embodiments, as hereinabove described, may be subjected to apparent modifications without departing from the true scope and spirit of the invention. The inventors, accordingly, hereby state their intention to rely upon the Doctrine of Equivalents, in order to protect their full rights in the invention.

We claim:

1. A data cartridge shuttle apparatus connected to a data cartridge drive mechanism, which includes a loading mechanism that is operable via the rotation of a handle thereon, said data cartridge shuttle apparatus facilitating the transfer of a data cartridge to and from said drive mechanism in a robotic data cartridge library by operation of a robotic hand on said data cartridge shuttle apparatus, said data cartridge shuttle apparatus comprising:

data cartridge inserting means, responsive to receipt of said data cartridge from said robotic hand and contact from said robotic hand, for operating said loading mechanism for inserting said data cartridge into said drive mechanism; and positioning means for operating said drive mechanism to place said drive mechanism and said data cartridge in a position of engagement to permit the conduct of drive operations by said drive mechanism upon said data cartridge.

2. The data cartridge shuttle apparatus as set forth in claim 1 wherein said positioning means comprises:

means for rotating said handle of said drive mechanism to move internal drive components of said drive mechanism into said position of engagement.

3. The data cartridge shuttle apparatus as set forth in claim 2 wherein said handle is coupled to a pivot rod, and said positioning means further comprises:

pawl and lever linkage coupled to said pivot rod.

4. The data cartridge shuttle apparatus as set forth in claim 3 wherein said positioning means further comprises:

means for contacting said pawl and lever linkage to actuate said handle through said pivot rod.

5. The data cartridge shuttle apparatus as set forth in claim 4 wherein said contacting means further comprises:

a slide member having a pawl stop for placing said pawl in a plurality of different orientations corresponding to the direction and history of travel of said pawl over said pawl stop.

6. The data cartridge shuttle apparatus as set forth in claim 4 wherein said contacting means comprises:

a slide member having a camming surface.

7. The data cartridge shuttle apparatus as set forth in claim 6 wherein said camming surface comprises:

retaining protrusion providing means for contacting said pawl and lever linkage to lock said data cartridge into a cartridge drive bay.

8. The data cartridge shuttle apparatus as set forth in claim 1 further comprising;

means for preventing damage to said positioning means in the event of mechanical malfunction.

9. The data cartridge shuttle apparatus as set forth in claim 8 wherein said positioning means comprises:

a pawl and lever linkage and said preventing means includes a torsion breakover wing formed within said pawl and lever linkage.

10. The data cartridge shuttle apparatus as set forth in claim 1 wherein said data cartridge inserting means comprises:

slide assembly having at least one slide member.

11. The data cartridge shuttle apparatus as set forth in claim 1 further comprising:

means for adapting said apparatus for use as an aftermarket retrofit assembly to said drive mechanism.

12. The data cartridge shuttle apparatus as set forth in claim 1 further comprising:

means, responsive to presence of said data cartridge in said data cartridge inserting means and contact from said robotic hand, for operating said loading mechanism to at least partially remove said data cartridge from said drive mechanism to a location where said robotic hand can grasp said data cartridge; and means for disengaging said data cartridge from said drive mechanism to permit said means for operating said loading mechanism to remove said data cartridge from said drive mechanism.

13. The data cartridge shuttle apparatus as set forth in claim 1 wherein said data cartridge inserting means comprises:

a spring biased slide member.

14. The data cartridge shuttle apparatus as set forth in claim 13 wherein said spring biased slide member is biased towards a location where said robotic hand can grasp said data cartridge.

* * * * *